(12) United States Patent
Estes

(10) Patent No.: US 6,305,610 B1
(45) Date of Patent: Oct. 23, 2001

(54) AUTOMATIC FLUID TEMPERATURE CONTROLLER AND WASHING MACHINE INCORPORATING SAME

(75) Inventor: Bay E. Estes, Palatine, IL (US)

(73) Assignee: Ranco Incorporated of Delaware, Wilmington, DE (US)

( * ) Notice: Subject to any disclaimer, the term of this patent is extended or adjusted under 35 U.S.C. 154(b) by 0 days.

(21) Appl. No.: 09/591,460

(22) Filed: Jun. 9, 2000

(51) Int. Cl.[7] .......................... D06F 33/00; G05D 23/12
(52) U.S. Cl. .............................. 236/12.12; 68/12.03
(58) Field of Search ...................... 236/12.12, 12.11; 68/12.03, 12.21, 12.22

(56) References Cited

U.S. PATENT DOCUMENTS 4,406,401 * 9/1983 Nettro ........................... 236/12.12
4,643,350 * 2/1987 Deschaaf et al. ................ 236/12.12

* cited by examiner

Primary Examiner—William Wayner
(74) Attorney, Agent, or Firm—John M. England, Jr.; Terrence (Terry) Martin; Jules Jay Morris

(57) ABSTRACT

A water temperature control circuit for a washing machine includes window detector and dual water valve drivers to modulate the hot and cold water valves to maintain the water temperature at a desired level. A temperature selector switch provides hot, regulated hot, warm, regulated warm, and cold temperature settings for the washing machine. During regulated temperature operation the window detector modulates one of the water valves to maintain the water temperature within a narrow temperature band. The window comparator includes two comparators that receive a common temperature input from a temperature sensing element. As such, no shunt resistor is required for one or the other comparators, thus improving accuracy. The control circuit operates open loop with respect to the hot and cold water valves that it controls, utilizing instead only the temperature input for controlling the proper water valve when enabled.

16 Claims, 4 Drawing Sheets

| Temperature | ATC Enable | Hot Enable | Cold Enable |
|---|---|---|---|
| Hot | OFF | ON | OFF |
| Regulated Hot | ON | ON | OFF |
| Warm | OFF | ON | ON |
| Regulated Warm | ON | OFF | ON |
| Cold | OFF | OFF | ON |

AUTOMATIC FLUID TEMPERATURE CONTROLLER AND WASHING MACHINE INCORPORATING SAME

FIELD OF THE INVENTION

This invention is directed to fluid temperature controllers, and more particularly to fluid temperature controllers suited for regulating the temperature of the water used in a clothes washing machine.

BACKGROUND OF THE INVENTION

Continuing advances and changes in the types of fabrics, materials, and colors used in the apparel industry are putting increasing pressure on the garment and clothes cleaning industry. Brighter colors and more delicate fabrics require specialized care and tighter tolerances on every aspect of the cleaning cycle, including better regulation of water temperature. While businesses may be able to afford more sophisticated controls for their industrial washing machines to allow them to be better regulated, modern pressures on time and personal budgets diminish the desirability of new fashions that require professional cleaning only. Unfortunately, the current state of the art for water temperature control in consumer washing machines may not maintain the water temperature within tight enough tolerances for these new fabrics, materials, or colors.

In current washing machines the water temperature control regulates temperature of the water during the fill of the tub. This is done by having either the cold or the hot water valve on, and then modulating the other valve to maintain the aggregate temperature of the water in the tub within a certain range. The particular valve that is commanded to be continuously on (cold or hot) is selected via a user actuated water temperature control switch. If the user selects HOT on the temperature selector switch, for example, the controller may turn on the hot water valve continuously and modulate the cold water valve on and off to maintain the temperature at a pre-selected setpoint. If, on the other hand, a user selects WARM, the controller may turn on the cold water valve continuously and modulate the hot water valve to maintain the water temperature in the tub at a different pre-selected setpoint.

One problem with many conventional water temperature controllers which introduces an unacceptable tolerance error in the control set points may be better understood with reference to FIG. 5. As may be seen from this conventional temperature controller, a single reference voltage Vcc is used for both temperature set points as monitored by comparators 13 and 15. The actual temperature measurement is made by a thermistor 17 placed in the water flow. A pull-up resistor 19 biases the thermistor 17 to establish a voltage at node 11 used by comparator 13 to turn on a water solenoid driver circuit 21. A shunt resistor 23 coupled across the thermistor 17 is used to develop the second temperature reading for the comparator 15 to turn on a water solenoid driver circuit 21.

The particular water valve that is controlled by the solenoid driver circuitry 21 is determined by the position of selector switch 25. The particular comparator 13, 15 that is enabled for temperature sensing control is determined by comparators 27, 29 based on the position of the hot water valve (via input 31). When the hot water valve is turned on full time, comparator 15 modulates the cold water valve, and when the cold water valve is turned on full time, comparator 13 modulates the hot water valve. Unfortunately, this sensing of the hot water valve at input 31 and selection via comparators 27 and 29 increases the cost and complexity, and reduces the reliability of this circuit. Further, the requirement for the valve driver selector switch 25 and its associated driver circuitry 33 also adds to the cost and detracts from the reliability of the water temperature controller. In the highly competitive and cost conscience consumer appliance industry, the requirement for four comparators 13, 15, 27, and 29, a hot water valve sense input 31, and a selector switch 25 (and its associated circuitry 33) in the water temperature control circuit detrimentally impacts the marketability of appliances that incorporate such high cost circuitry.

There, therefore, exists a need in the art for a new and improved water temperature controller that has tighter tolerance on temperature variation, that is more cost effective, and that is less complex with a higher reliability than current designs.

SUMMARY OF THE INVENTION

In view of the above, it is an object of the instant invention to provide a new and improved fluid temperature control circuit that overcomes the above described and other problems existing in the art. Specifically, it is an object of the instant invention to provide a new and improved temperature control circuit that provides temperature regulation within narrow tolerances. Further, it is an object of the invention to provide a temperature controller that is less complex and more cost effective with improved reliability over prior designs. Additionally, it is an object of the invention to provide a fluid temperature controller that is suitable for use in a washing machine environment to control the water temperature.

In view of these objects, it is a feature of the instant invention to provide a fluid temperature controller that modulates the hot and cold water valves to regulate the water temperature of the fill water in a washing machine. It is a further feature that the proper modulation of the hot and cold valves is accomplished without input sensing of either these valves, and without an output driver selection switch. It is also a feature of the instant invention that the water temperature for both the hot and cold valve modulation is accomplished with a single thermistor without the necessity of a shunt resistor. Another feature of the instant invention is the use of a window comparator having two thresholds, with hysteresis, to maintain the temperature at the desired level.

In view of these objects and features of the invention, a preferred embodiment of the instant invention provides a fluid temperature control circuit for a washing machine having a hot water valve and a cold water valve controllable to provide a flow of hot and cold water, respectively, into a washing chamber. A temperature selector switch having an output to energize the hot water valve, an output to energize the cold water valve, and an output to enable operation of the fluid temperature control circuit. The fluid temperature control circuit comprises a temperature sensing element positioned to sense a temperature of water flowing into the washing chamber and a window detector circuit in sensory communication with the temperature sensing element. The window detector circuit includes a first and a second output, the first output being active when the temperature of the water is below a first threshold, and the second output being active when the temperature of the water is above a second threshold. The control circuit also includes a pair of water valve driver circuits responsive to the first and the second outputs of the window detector circuit to energize the hot water valve and the cold water valve.

Preferably, the temperature sensing element is a thermistor. Further, the first output of the window detector circuit is inactive when the temperature of the water is above a third threshold. The first and the third thresholds define a temperature regulation band in which the water temperature is maintained when the second and third outputs of the temperature selector switch are energized. Additionally, the second output of the window detector circuit is inactive when the temperature of the water is below a fourth threshold. In this embodiment, the second and the fourth thresholds define a temperature regulation band in which the water temperature is maintained when the first and third outputs of the temperature selector switch are energized. The window detector circuit preferably comprises a first and a second comparator, each having an inverting and a non-inverting input and an output. The inverting input of the first comparator and the non-inverting input of the second comparator are coupled to a common node that is in sensory communication with the temperature sensing element.

In an alternate preferred embodiment of the invention, a system for controlling the temperature of an aggregate fluid having hot and cold fluid constituents is provided. A hot fluid valve and a cold fluid valve separately control each of the hot and the cold fluid constituents. The system comprises a temperature selection switch having a hot enable output coupled to the hot fluid valve, a cold enable output coupled to the cold fluid valve, and an automatic temperature controller (ATC) enable output. A temperature sensing element is positioned to sense a temperature of the aggregate fluid. An automatic temperature controller (ATC) circuit having an input coupled to the ATC enable output, a first output coupled to the hot fluid valve, and a second output coupled to the cold fluid valve is also included. Preferably, the temperature selection switch provides at least one temperature regulated selection, a hot selection, and a cold selection. This temperature selection switch also provides a regulated hot selection and a regulated warm selection. The regulated hot selection provides the hot enable output and the ATC enable output, and the regulated warm selection provides the cold enable output and the ATC enable output.

In one embodiment, the ATC circuit comprises a window detector circuit having a first and a second comparator. These two comparators have a common temperature input in sensory communication with the temperature sensing element. Preferably, the common temperature input is coupled to an inverting terminal of the first comparator and to a non-inverting terminal of the second comparator. Also included is fluid valve driver circuitry having a first and a second pair of fluid valve drivers. The first fluid valve driver has an output coupled to the hot fluid valve, and the second fluid valve driver has an output coupled to the cold fluid valve. The comparators preferably establish a first and a second fluid valve control threshold.

The first comparator provides an output to the first fluid valve driver to open the hot fluid valve when the temperature of the aggregate fluid is below the first threshold, and the second comparator provides an output to the second fluid valve driver to open the cold fluid valve when the temperature of the aggregate fluid is above the second threshold. The first comparator further establishes a third threshold, and removes the output from the first fluid valve driver to close the hot fluid valve when the temperature of the aggregate fluid is above the third threshold. The second comparator further establishes a fourth threshold, and removes the output from the second fluid valve driver to close the cold fluid valve when the temperature of the aggregate fluid is below the fourth threshold. The ATC circuit preferably operates open loop with respect to the hot and the cold fluid valves.

In an alternate preferred embodiment of the invention, a water temperature controller for a washing machine having a temperature sensing element positioned therein to sense water temperature, a hot water control valve, and a cold water control valve, comprises a temperature sense conditioning circuit coupled to the temperature sensing element. This temperature sense conditioning circuit provides a temperature output signal representative of the water temperature. The controller also includes a first comparator having an input coupled to the temperature output signal that generates a first output enable signal when the water temperature is below a first threshold. A second comparator is also included having an input coupled to the temperature output signal that generates a second output enable signal when the water temperature is above a second threshold.

The controller also includes a hot water valve driver circuit coupled to the first comparator. The hot water valve driver circuit energizes the hot water valve to supply hot water to the washing machine upon receipt of the first output enable signal. A cold water valve driver circuit is coupled to the second comparator, and energizes the cold water valve to supply cold water to the washing machine upon receipt of the second output enable signal. The first comparator includes hysteresis such that once the first output enable signal is generated, the first output enable signal is removed when the water temperature is above a third threshold (the third threshold being above the first threshold). The second comparator also includes hysteresis such that once the second output enable signal is generated, the second output enable signal is remove when the water temperature is below a fourth threshold (the fourth threshold being below the second threshold). Preferably, the temperature output signal is coupled to an inverting input of the first comparator and to a non-inverting input of the second comparator.

Other objects and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

As described above, there is a great need in the appliance industry, and in particular with respect to washing machines, for a temperature controller that regulates the temperature of water using hot and cold water valves. While the instant invention is particularly well suited for such application, it should be understood that the teachings of the instant invention may well be suited to other applications for fluid temperature control. Therefore, the following discussion is presented by way of example and not by way of limitation.

Figure 1:
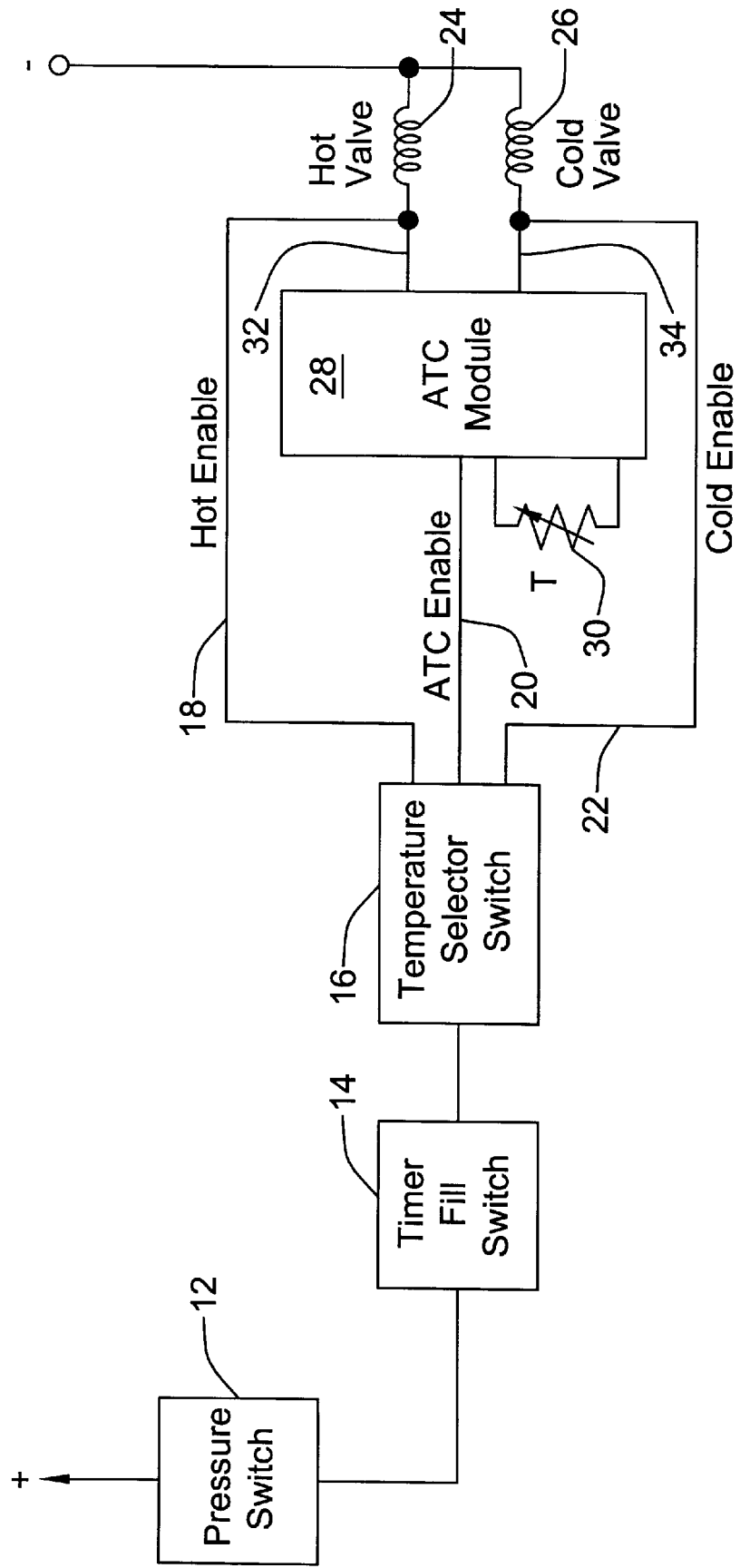
FIG. 1 is a simplified block diagram of a temperature control system for a washing machine in accordance with an embodiment of the instant invention.

Turning now to the drawings, and in particular to FIG. 1, an embodiment of a temperature control system 10 is illustrated for use in a washing machine. The system 10 includes a conventional pressure switch 12 coupled between a source of power (V) and a program timer fill switch 14. This timer fill switch provides proper coordination of the filling of the washing tub with the washing cycle. Also included in this system 10 is a user-actuated temperature selector switch 16. This switch 16 allows the user to select the desired temperature for the particular type of clothes that are to be cleaned by the washing machine. Alternatively or additionally, an automated wash cycle control (not shown) may also provide the proper temperature selection for different types of wash cycles, depending on the washer's features design.

In a preferred embodiment, the switch 16 includes a selection for Hot, Regulated Hot, Warm, Regulated Warm, and Cold, although other (additional, fewer, or different) settings are possible. In this embodiment, the switch 16 includes outputs 18, 20, and 22. Output 18 (Hot Enable) provides power to the hot water valve 24, output 22 (Cold Enable) provides power to the cold water valve 26, and output 20 (ATC Enable) provides power to the automatic temperature control (ATC) module 28. The ATC 28 also includes inputs for the sensing of a thermistor 30 that is positioned within the washing machine to sense the temperature of the water. The ATC 28 of the instant invention also includes two outputs 32, 34 to control the hot valve 24 and the cold valve 26 respectively.

Figures 2, 3:
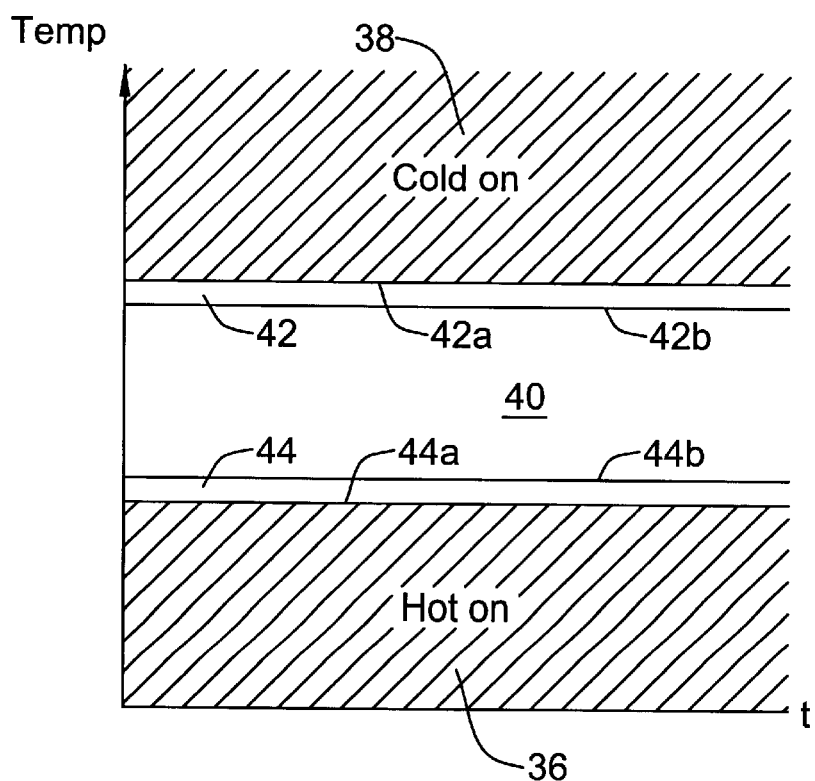
FIG. 2 is a logic state table illustrating operating states of the temperature control system of FIG. 1.
FIG. 3 is a graphical illustration of the dual threshold window control for the hot and cold water valves in accordance with an embodiment of the instant invention.

Turning now to the logic state diagram of FIG. 2, the operation of the temperature selector switch 16, in terms of its outputs, is illustrated. As may be seen from this state diagram, when the temperature selected by the user is Hot, the Hot Enable output 18 is energized to open the hot water valve. The other outputs 20, 22 are not energized or are off. If the user (or automatic control) selects the Regulated Hot setting, both the Hot Enable output 18 and the ATC Enable output 20 are energized, while the Cold Enable output 22 remains off. If the Warm temperature setting is selected, both the Hot Enable output 18 and the Cold Enable output 22 are on while the ATC Enable output 20 is off. For a selection of Regulated Warm, the Cold Enable output 22 and the ATC Enable output 20 are on while the Hot Enable output 18 is off. Finally, if the temperature selection is Cold, the Cold Enable output 22 is on while both the Hot Enable output 18 and the ATC Enable output 20 are off.

While it is clear from the foregoing description and an analysis of FIGS. 1 and 2 that the hot valve is open whenever the Hot Enable output 18 is energized and that the cold valve is open whenever the Cold Enable output 22 is energized, the operation of the ATC requires further discussion. Specifically, the ATC 28 operates to control the two water valves based on the temperature of water sensed by the thermistor 30 (see FIG. 1). While various types of control are contemplated, modulation control of the hot and cold valves will be described herein.

The ATC 28 operates on a window detector principle as illustrated in FIG. 3. As will be recognized, this window detection control operates to turn on the hot valve by energizing output 32 when the sensed temperature of the water falls into region 36 of the graph of FIG. 3. Similarly, the ATC 28 operates to turn on the cold valve by energizing output 34 when the sensed water temperature is in region 38 of this temperature graph. Within region 40 the ATC 28 does not energize either output 32, 34, relying on the Hot Enable output 18 or Cold Enable output 22 to bring the water temperature into one of the temperature control zones 36, 38, depending on whether the Regulated Hot or Regulated Warm temperature settings have been selected, respectively.

A hot regulation band 42, defined by a cold turn on limit 42a and a cold turn off limit 42b, is utilized by the ATC 28 to maintain the water temperature within a narrow tolerance for the Regulated Hot setting. Likewise, a cold regulation band 44, defined by a hot turn on limit 44a and a hot turn off limit 44b, is utilized by the ATC 28 to maintain the water temperature within a narrow tolerance for the Regulated Warm setting. While the various limits may be set at any level based on system requirements, preferably the bands 42, 44 are each approximately 2° F. As will be described in greater detail below, each of these bands may be individually set to different tolerances as desired. Likewise, the positioning of the bands (the setting of the average temperature for the regulated settings may also be set to different user or system defined levels.

Upon initiation of a wash fill cycle when a user or automatic control has designated the Regulated Hot temperature setting on the Temperature Selector Switch 16, the Hot Enable output 18 energizes the hot valve 24 to begin the fill process. At the same time the ATC 28 is also enabled (see FIG. 2) via the ATC Enable output 20. The window detector control of the ATC 28 will sense a temperature below the hot turn on level 44a (see FIG. 3), and energize output 32 to open the hot valve. Of course, the hot valve 24 has already been energized by the Hot Enable output 18 and so is already open. As the temperature of the water rises beyond the hot turn off level 44b of the ATC as sensed by the thermistor 30, the output 32 is turned off. However, since the Hot Enable line 18 is still energized, the hot valve stays open, filling the tub with hot water. As the temperature of the water exceeds the cold turn on setpoint 42a, the cold valve 26 is energized by the ATC 28 via output 34. With the cold water valve open, the temperature of the water will begin to fall. Once the falling water temperature has reached the cold turn off limit 42b, the ATC turns off output 34 to close the cold water valve. With the cold water off, the temperature will again begin to rise since the Hot Enable line 18 is still energized. The ATC will maintain the water temperature within the band 42 by continuing this cycle as the water temperature rises and falls between the two set points 42a and 42b.

Upon initiation of a wash fill cycle when a user or automatic control has designated the Regulated Warm temperature setting on the Temperature Selector Switch 16, the Cold Enable output 22 energizes the cold valve 26 to begin the fill process. At the same time the ATC 28 is also enabled (see FIG. 2) via the ATC Enable output 20. The window detector control of the ATC 28 will sense a temperature below the hot turn on level 44a (see FIG. 3), and energize output 32 to open the hot valve. As the temperature of the water rises beyond the hot turn off level 44b of the ATC as sensed by the thermistor 30, the output 32 is turned off. Since the Cold Enable line 22 is still energized, the cold valve stays open, filling the tub with cold water. As the temperature of the water drops below the hot turn on setpoint 44a, the hot valve 24 is energized by the ATC 28 via output 32. With the hot water valve open, the temperature of the water will begin to rise. Once the rising water temperature has reached the hot turn off limit 44b, the ATC turns off output 32 to close the hot water valve. With the hot water off, the temperature will again begin to fall since the Cold Enable line 22 is still energized. The ATC will maintain the water temperature within the band 44 by continuing this cycle as the water temperature rises and falls between the two set points 44a and 44b.

Figure 4:
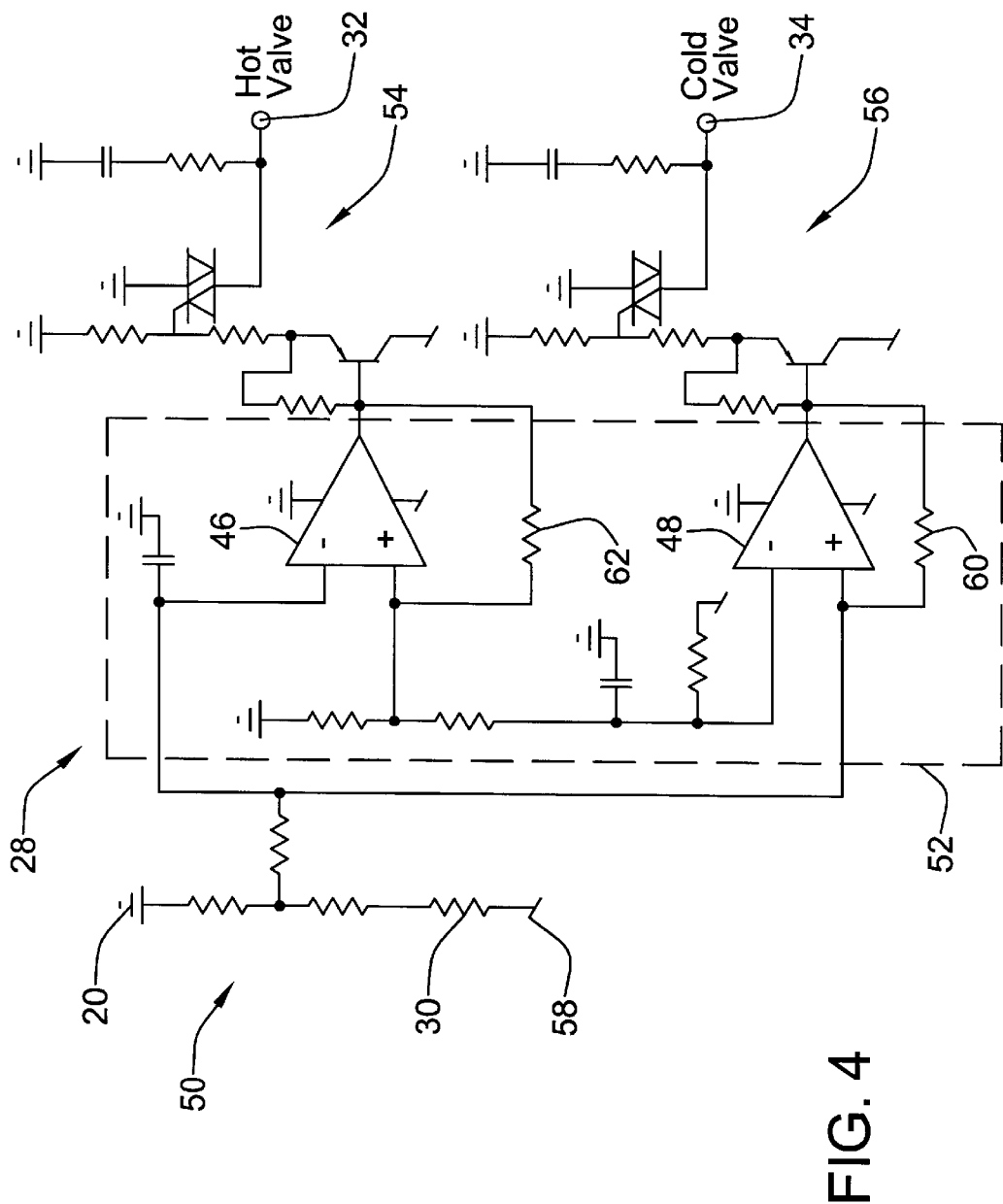
FIG. 4 is a single line electrical schematic of an embodiment of a temperature control circuit constructed in accordance with the teachings of the instant invention.
Figure 5:
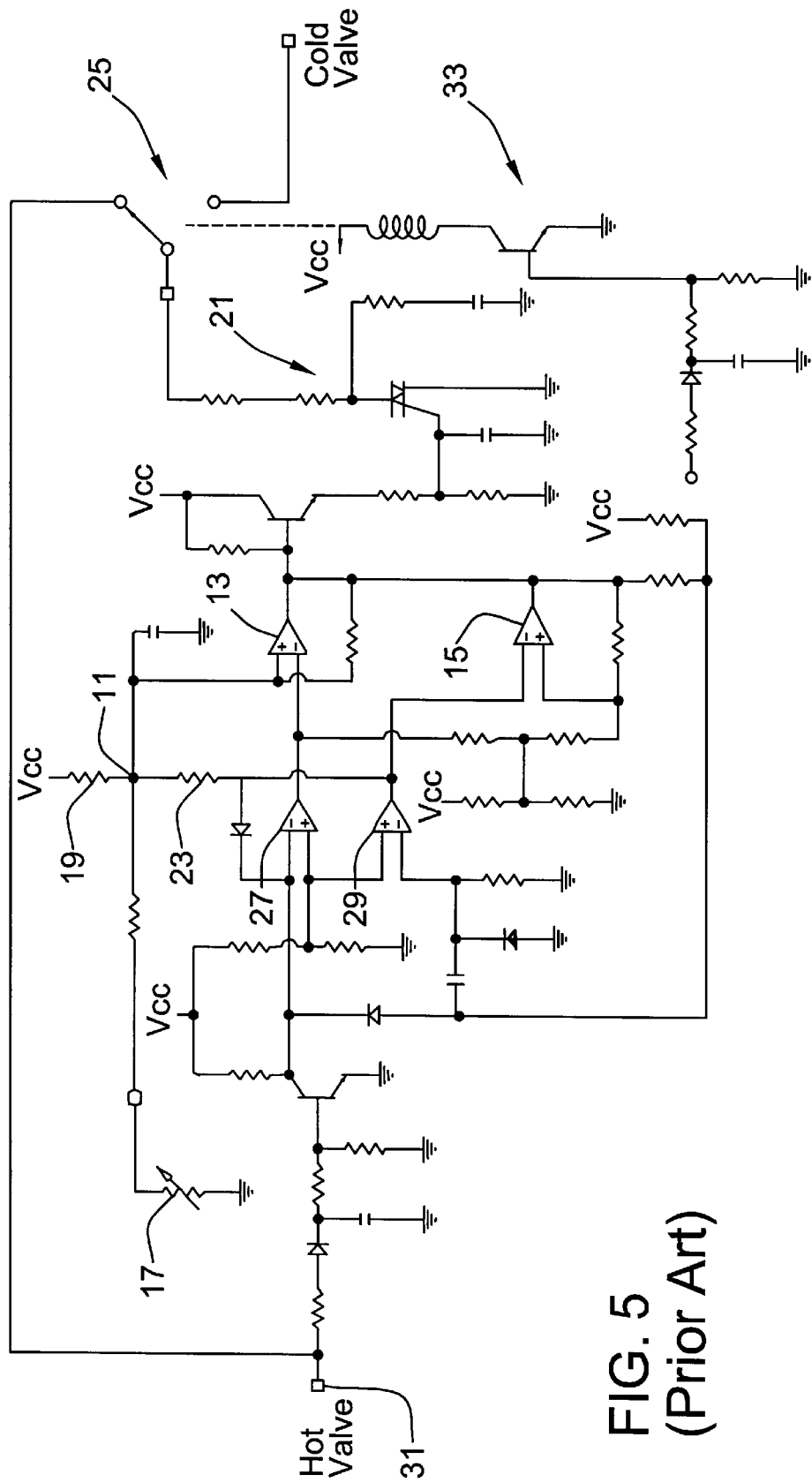
FIG. 5 is a single line electrical schematic of a conventional water temperature control circuit for use in washing machines.

With an understanding of the operation of the system and method of the instant invention, attention is now directed to FIG. 4, which illustrates an exemplary embodiment of a circuit constructed in accordance with the teachings of the invention. As may be seen from a brief overview of this schematic, only two comparators 46, 48 are required to perform the functions described above. This represents a significant saving in both complexity and cost over prior designs. Further, it may be noted that this circuit contains no input sense of either the hot or cold valve, which also reduces the complexity of this circuit. It may also be noted that no output switch is required to select one of the hot or cold water valves for energization as with the prior designs, presenting yet a further improvement.

Specifically, this embodiment of the invention includes an input sense of thermistor 30 that has an inverse temperature/resistance coefficient. That is to say, as the temperature of the water increases, the resistance of the thermistor 30 decreases. The voltage developed across the resistor network 50 is used by the window detector circuitry 52 to indicate which water valve should be energized via driver circuitry 54, 56. To accomplish the windowing performance illustrated in FIG. 3, the temperature sense voltage is input to the negative input of comparator 46, and the positive input of comparator 48 in this exemplary embodiment utilizing a negative power supply (e.g. −24 Vdc) 58 and ground 20 (supplied in this embodiment by the Temperature Selector Switch 16 via ATC Enable 20 line). While a negative supply is used in this exemplary embodiment, one skilled in the art will recognize that this circuitry 28 could also be constructed with a positive power supply and appropriate polarity changes.

Upon initially enabling circuitry 28 (by supplying ground 20 via the temperature selector switch 16 to the resistor network 50), the window detector 52 is active. If the water temperature sensed by thermistor 30 is low, the voltage input to the negative input of comparator 46 is high, resulting in its output is low. This energizes the driver circuitry 54 and results in the opening of the hot water valve to supply hot water in accordance with FIG. 3. As the temperature sensed by thermistor 30 increases, the voltage input to the comparators 46, 48 decreases to a point where the output of comparator 46 goes high (see setpoint 44b in FIG. 3). This turns off the hot water valve. If the temperature sensed by thermistor 30 continues to increase, the voltage input to the comparators 46, 48 decreases to a point where the output of comparator 48 goes low (see setpoint 42a in FIG. 3). This energizes the driver circuitry 56 and turns on the cold water valve.

If the temperature of the water sensed by thermistor 30 begins to drop, the voltage input to the comparators 46, 48 increases to a point where the output of comparator 48 goes high (see setpoint 42b in FIG. 3). This turns off the cold water valve. Hysteresis resistor 60 establishes this voltage point (42b) at a voltage level different than the turn on level (42a). If the temperature continues to decrease, the input voltage to the comparators 46, 48 increases to a point (44a) where the output of comparator 46 goes low, thus turning on the hot valve. Hysteresis resistor 62 establishes this voltage point (44a) at a voltage level different than the turn off level (44b).

Numerous modifications and alternative embodiments of the invention will be apparent to those skilled in the art in view of the foregoing description. Accordingly, this description is to be construed as illustrative only and is for the purposes of teaching those skilled in the art the best mode for carrying out the invention. The details of the structure may be varied substantially without departing from the spirit of the invention, and exclusive use of all modifications that come within the scope of the appended claims is reserved.

What is claimed is:

1. A fluid temperature control circuit for a washing machine having a hot water valve and a cold water valve controllable to provide a flow of hot and cold water, respectively, into a washing chamber, and a temperature selector switch having a first output to energize the hot water valve, a second output to energize the cold water valve, and a third output to enable operation of the fluid temperature control circuit, the fluid temperature control circuit comprising:

a temperature sensing element positioned to sense a temperature of water flowing into the washing chamber;

a window detector circuit in sensory communication with said temperature sensing element, said window detector circuit having a first and a second output, said first output being active when the temperature of the water is below a first threshold, and said second output being active when the temperature of the water is above a second threshold; and a pair of water valve driver circuits responsive to said first and said second outputs of said window detector circuit to energize the hot water valve and the cold water valve.

2. The circuit of claim 1, wherein said temperature sensing element is a thermistor.

3. The circuit of claim 1, wherein said first output of said window detector circuit is inactive when the temperature of the water is above a third threshold.

4. The circuit of claim 3, wherein said first and said third thresholds define a temperature regulation band therebetween in which the water temperature is maintained when the second and third outputs of the temperature selector switch are energized.

5. The circuit of claim 1, wherein said second output of said window detector circuit is inactive when the temperature of the water is below a fourth threshold.

6. The circuit of claim 5, wherein said second and said fourth thresholds define a temperature regulation band therebetween in which the water temperature is maintained when the first and third outputs of the temperature selector switch are energized.

7. The circuit of claim 1, wherein said window detector circuit comprises a first and a second comparator each having an inverting and a non-inverting input and a an output, and wherein said inverting input of said first comparator and said non-inverting input of said second comparator are coupled to a common node in sensory communication with said temperature sensing element.

8. A system for controlling the temperature of an aggregate fluid having hot and cold fluid constituents, each of the hot and the cold fluid constituents being separately controlled by a hot fluid valve and a cold fluid valve, the system comprising:

a temperature selection switch having a hot enable output coupled to the hot fluid valve, a cold enable output coupled to the cold fluid valve, and an automatic temperature controller (ATC) enable output;

a temperature sensing element positioned to sense a temperature of the aggregate fluid; and an automatic temperature controller (ATC) circuit having an input coupled to said ATC enable output, a first output coupled to the hot fluid valve, and a second output coupled to the cold fluid valve.

9. The system of claim 8, wherein said temperature selection switch provides at least one temperature regulated selection, a hot selection, and a cold selection.

10. The system of claim 9, wherein the temperature selection switch provides a regulated hot selection and a regulated warm selection, and wherein said regulated hot selection provides said hot enable output and said ATC enable output, and wherein said regulated warm selection provides said cold enable output and said ATC enable output.

11. The system of claim 8, wherein said ATC circuit comprises:

a window detector circuit having a first and a second comparator, said first and said second comparators having a common temperature input in sensory communication with said temperature sensing element; and fluid valve driver circuitry having a first and a second pair of fluid valve drivers, said first fluid valve driver having an output coupled to the hot fluid valve and said second fluid valve driver having an output coupled to the cold fluid valve.

12. The system of claim 11, wherein said first and said second comparators establish a first and a second fluid valve control threshold, said first comparator providing an output to said first fluid valve driver to open the hot fluid valve when the temperature of the aggregate fluid is below said first threshold, said second comparator providing an output to said second fluid valve driver to open the cold fluid valve when the temperature of the aggregate fluid is above said second threshold.

13. The system of claim 12, wherein said first comparator further establishes a third threshold, said first comparator removing said output from said first fluid valve driver to close the hot fluid valve when the temperature of the aggregate fluid is above said third threshold.

14. The system of claim 12, wherein said second comparator further establishes a fourth threshold, said second comparator removing said output from said second fluid valve driver to close the cold fluid valve when the temperature of the aggregate fluid is below said fourth threshold.

15. The system of claim 11, wherein said common temperature input is coupled to an inverting terminal of said first comparator and to a non-inverting terminal of said second comparator.

16. The system of claim 8, wherein said ATC circuit operates open loop with respect to the hot and the cold fluid valves.

* * * * *